United States Patent [19]

Fronius

[11] Patent Number: 4,521,672
[45] Date of Patent: Jun. 4, 1985

[54] ELECTRONIC WELDING APPARATUS

[75] Inventor: Klaus Fronius, Pettenbach, Austria

[73] Assignee: Miller Electric Manufacturing Company, Appleton, Wis.

[21] Appl. No.: 436,891

[22] Filed: Oct. 26, 1982

[30] Foreign Application Priority Data

Oct. 27, 1981 [AT] Austria ............................ 4565/81
Jun. 14, 1982 [AT] Austria ............................ 2295/82
Sep. 30, 1982 [AT] Austria ............................ 3622/82

[51] Int. Cl.³ .............................................. B23K 9/10
[52] U.S. Cl. ........................ 219/130.33; 219/130.51; 363/95
[58] Field of Search ............... 219/130.33, 130.32, 219/130.31, 130.51, 125.11; 363/132, 98, 95

[56] References Cited

U.S. PATENT DOCUMENTS

| | | | |
|---|---|---|---|
| 3,728,516 | 4/1973 | Daspit | 219/130.33 |
| 3,912,980 | 10/1975 | Crump et al. | 219/130.33 |
| 4,020,361 | 4/1977 | Suelzle et al. | 363/132 |
| 4,144,992 | 3/1979 | Omae et al. | 219/125.11 |
| 4,201,906 | 5/1980 | Puschner | 219/130.33 |
| 4,320,282 | 3/1982 | McDonald et al. | 219/130.33 |
| 4,403,269 | 9/1983 | Carroll | 362/132 |

FOREIGN PATENT DOCUMENTS 2019135 10/1979 United Kingdom ........... 219/130.33

OTHER PUBLICATIONS

A. J. Weissberger, "Microprocessors Simplify Industrial Control", *Electronic Design* 22, 10/25/75, pp. 96–99.

*Primary Examiner*—Clifford C. Shaw
*Attorney, Agent, or Firm*—Sughrue, Mion, Zinn, Macpeak, and Seas

[57] ABSTRACT

An electronic welding apparatus which, for controlling at least one welding parameter, such as welding voltage or welding current, comprises a switching mode power supply as a control element and preferably being regulated on the primary. The actual values of voltage and current are taken from the output of the switching mode power supply and fed to an analog control circuit. The set values of voltage and current are fed via an entry keyboard to a microprocessor where they are stored in a memory and passed on in analogous form to the analog control circuit which carries out a comparison of set value and actual value and, in dependence thereon, produces an error signal that is fed to a pulse width modultor which is connected to the driver stages of the power supply's switching stages which are designed as a boost regulator or a buck regulator, and thus a pulse width modulation of the current pulses of the switching stages is effected in dependence on the difference between actual and nominal values. Also fed to the microprocessor are the actual values of current and voltage which, together with other welding parameters fed in via the entry keyboard, such as rate of wire feed, wire thickness, type and pressure of the protective gas, watercooling etc., serve for monitoring the welding procedure.

10 Claims, 9 Drawing Figures 4,521,672

ELECTRONIC WELDING APPARATUS

BACKGROUND OF INVENTION

There are already known electric welding apparatus that comprise controlled rectifiers (thyristors). This and similar types of welding apparatus, however, will not do without voluminous and heavy-weight power transformers.

On the other hand, electronically controlled power supplies for small and medium power outputs, which are designed as socalled switched-mode power supplies (SMPS), are known primarily from laboratory technology and entertainment electronics. There, the power voltage at first is rectified, then "chopped" by a high switching frequency (mostly above 20 kHz), transformed to the desired voltage via a transformer, and finally rectified anew. By choosing a high switching frequency, the efficiency can be increased on the one hand and the volume and weight of the transformer can be considerably reduced on the other hand. There is a difference between primarily controlled and secondarily controlled switched mode power supplies, the control being effected either by changing the clock time at a constant frequency or by changing the frequency at a constant operation pulse duration. Mostly, quick power transistors with high operational voltages are used.

The field of application of switched mode power supplies so far has been restricted to television sets, LF power amplifiers, measuring devices, film and still projectors, accounting, calculating and typing machines, computers, voltage and current stabilizers for industry and laboratories, power supplies for fluorescent lamps, HF and LF generators, motor control, accumulator chargers, AC/AC-converters and low voltage power supplies with galvanic power separation. Depending on the output (1 to 3,000 W and more), the following types of converters are chosen with an increased output: single-ended boost regulators, single-ended buck regulators, push-pull half bridge, push-pull full bridge and push-pull parallel feed.

In particular with switched mode power supplies of higher outputs the problem arises that, due to power overvoltages or to line-side short-circuits, the admissible limits $U_{max}$, $J_{max}$ of the transistors used can be exceeded, which leads to a destruction of the transistors. Therefore, complex safety cut-out and operation-sequence circuits are required, e.g. overvoltage, peak current, overload, short-circuit fuse protections, switch-on and restarting measures and the like, which are mostly unnecessary with switched-mode power supplies of smaller outputs, since there the transistors may be chosen to be overdimensioned from the beginning in order to offer a certain safety. Therefore there has been a prejudice to building switched-mode power supplies of higher outputs, which are necessary e.g. for electric welding apparatus (more than 10,000 W).

OBJECT OF INVENTION

It is the object of the invention to remedy this prejudice and to provide a novel electronic welding apparatus by using a switched-mode power supply, so that the weight and volume of the welding tool can be reduced and its efficiency can be increased.

SUMMARY OF INVENTION

The invention provides a novel electronic welding apparatus which as control element for controlling at least one welding parameter, such as the welding current or the welding voltage, a controlled switched-mode power supply is provided. Preferably, a primary controlled switched-mode power supply is used, whose converter preferably is designed as a single-ended buck regulator with an asymmetric half-bridge switch, or as a push-pull full bridge, wherein it is operated at a fixed clock frequency of about 25 kHz, a change of the pulse duty cycle taking place by pulse-width modulation.

Further characteristic features and details of the invention will be described in the following with reference to the accompanying drawings, wherein.

Same parts shown in the drawings are provided with the same reference numerals.

Figure 1:
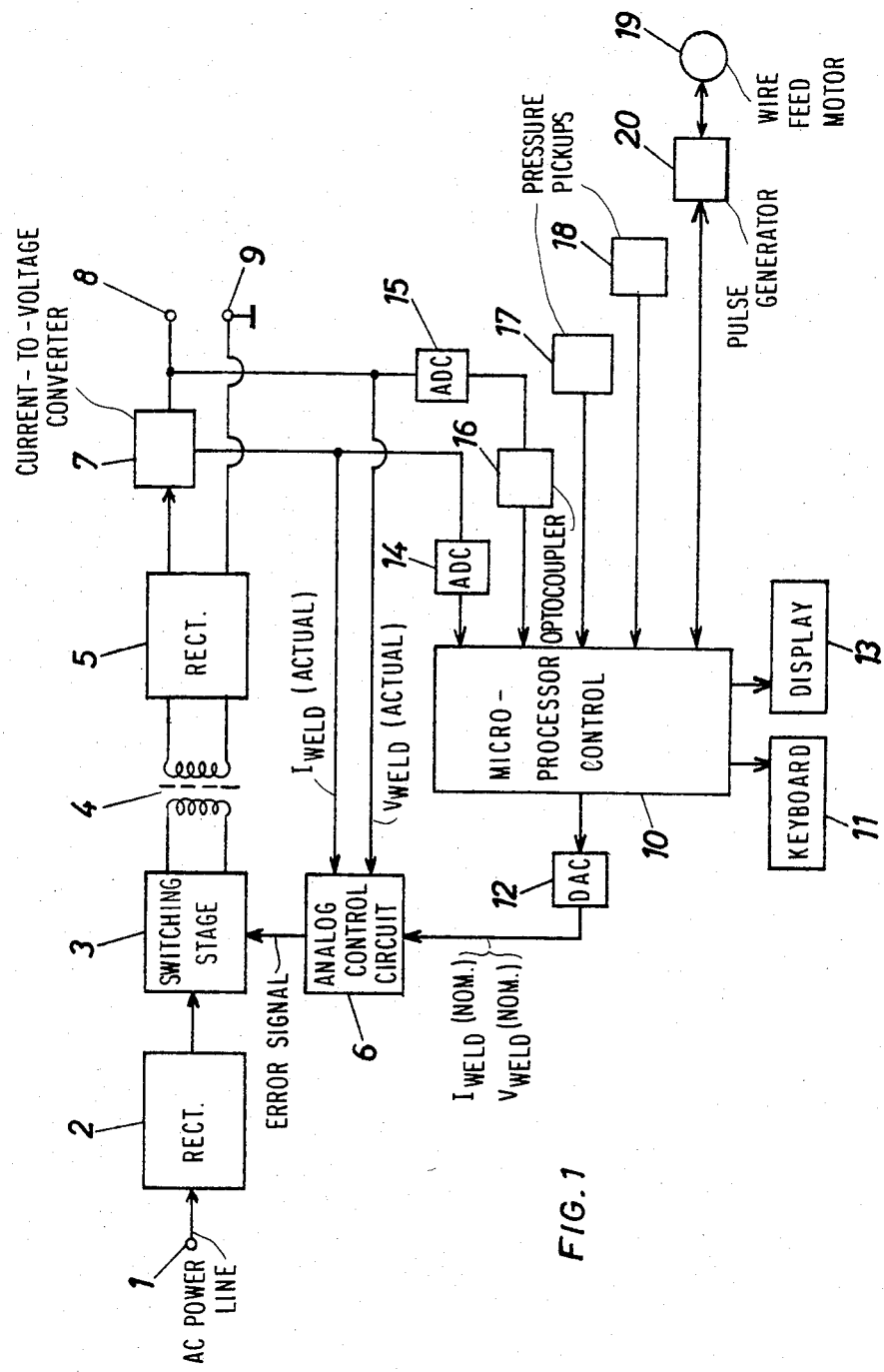
FIG. 1 is a block diagram of a preferred embodiment of the welding apparatus according to the invention, including a switched-mode power supply.

In FIG. 1 the power supply (e.g. 3×380 V rotary current or 220 V light current) is denoted by 1 and a power line rectifier is denoted by 2, which may also contain a power filter (not illustrated). To the rectifier 2 the converter or the switching stage 3 of the switched-mode power supply are connected, the rectified voltage being smoothable by filtering means, for instance, by capacitors (not illustrated).

The switching stage 3 contains switching transistors (bipolar power transistors, field-effect power transistors) or thyristors that can be switched on and off, which are controlled by a pulse-width modulator via driver stages, as will be explained later on by way of FIGS. 2 and 3. The switching transistors of the switching stage 3 chop the direct voltage supplied from the rectifier 2 and the chopped direct current is delivered through the primary coil of a transformer 4. To the secondary coil of the transformer 4 a secondary rectifier 5 is connected, which generates the desired welding current or welding voltage, a filter choke (not illustrated) being provided, if required.

The pulse width modulator in the switching stage 3 is controlled by an analog control circuit 6 by way of an error signal, to which analog control the nominal and actual values of the welding current and the welding voltage are fed. For this purpose, a current-to-voltage converter (e.g. a Hall converter) 7 is provided at the output of the rectifier 5 to detect the actual value of the welding current, while the actual value of the welding voltage is taken directly. A terminal 8 departing from the current-to-voltage converter 7 as well as a terminal 9 departing from the secondary rectifier 5 serve to connect the welding cable, the terminal 9 being connected to frame. In this embodiment a microprocessor control 10 is provided, which fulfills a plurality of controlling and regulating functions. Via an entry keyboard 11 the nominal values of the welding current or of the welding voltage may be entered into a storage of the microprocessor control 10, which are then read out and fed to the analog control circuit 6 via digital to analog converter (DAC) 12. A preferably alphanumerical display 13 indicates the nominal values entered. On grounds of the difference between the actual and nominal values, the analog control circuit 6 emits an error signal to the pulse width modulator and controls the switching stage 3 in a manner that a substantially constant welding current, or optionally a constant welding voltage occur at the output of the switched-mode power supply. The structure of the analog control circuit 6 is known to one skilled in the art and thus need not be discussed in detail.

Furthermore, it is provided according to the invention that the values of the welding current and the welding voltage of the microprocessor control are fed via analog to digital converters (ADC) 14 and 15 in order to calculate an output value on grounds of the product formation of current and voltage, which product is fed to the analog control circuit 6 as the actual value. This kind of actual value as a function of the output is advantageous for some welding procedures. For the purpose of galvanic separation, an optocoupler 16 is provided between the microprocessor control 10 and the analog-to-digital converter 15.

To the microprocessor control 10 also the signals of two pressure pickups 17 and 18 are transmitted, which are arranged in the line, for the protection gas and in the water cooling circuit, the pressures thus being monitored and controlled by the microprocessor, and the welding procedure being initiated, by orders from the microprocessor when the correct pressure exist values. The pressure values also may be indicated via the display 13.

The monitoring and control of a wire feed motor 19 also is effected via the microprocessor control 10, the number of revolutions being detected, for instance, by an optoelectronic rotatable pulse generator 20 and transmitted as the actual value to the microprocessor control.

The input of the desired values for the rate of wire feed, wire thickness, type of gas, etc. is effected also via the entry keyboard 11, wherein e.g. the connection between the welding voltage on the one hand and the rate of wire feed, the wire thickness and the type of gas on the other hand are stored as a program in a storage (e.g. a write-read storage) of the microprocessor control 10. Thereby it is possible to store any desired welding adjustments and to call them on demand (e.g. for robot welding).

In this example of the invention, an analog control circuit 6 is provided for controlling the switching section 3, but it is also possible to extend the microprocessor control 10 so as to replace the analog control circuit 6 by taking over its function.

The welding tool according to the invention is excellently suited for the MIG-MAG, pulsed-arc, WIG and manual electrode welding procedures.

The alphanumerical display 13, if desired, may be replaced by a data display, a printer or an audio response unit.

By using several parallelly connected voltage-stable power switching transistors as switches in the switching stage 3, welding apparatus of the type according to the invention having a nominal output of from 13 kVA to 50 kVA can be manufactured.

Figure 2:
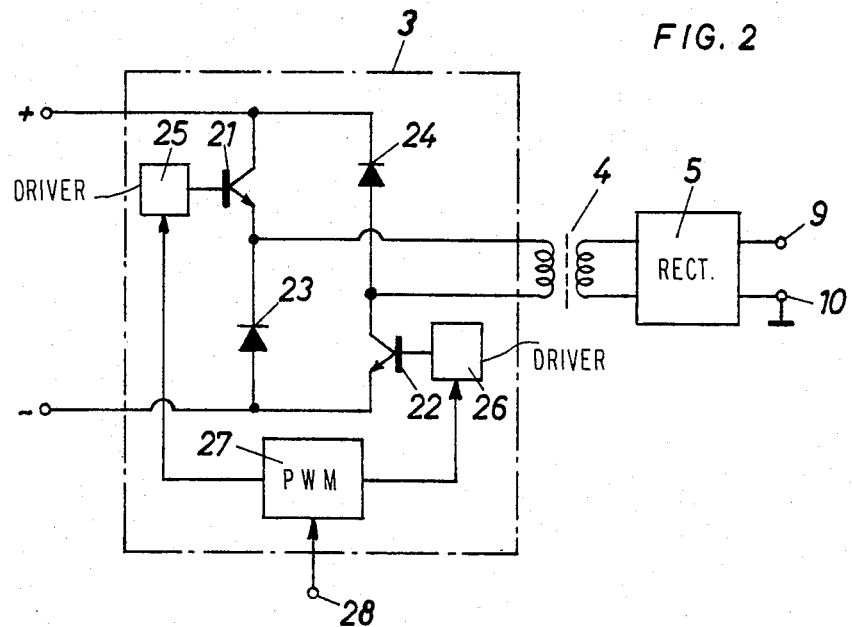
FIG. 2 illustrates the converter section of the switched-mode power supply as a single-ended buck regulator with an asymmetric half-bridge switch.

FIG. 2 illustrates a switching stage 3 that is known as a single-ended buck regulator with an asymmetrical half-bridge converter. Two switching transistors 21, 22 are parallelly connected via diodes 23, 24 connected in series with transistors 21 and 22 respectively, and are fed by the direct voltage supplied from the power line rectifier 2 (FIG. 1). The primary coil of the transformer 4 is connected with the diodes 23, 24 between the irrespective connection points with the transistors 21, 22. The transistors 21, 22 are simultaneously switched on and off by the pulse width modulator (PWM) 27 via driver stages 25, 26, the input terminal 28 of the modulator being connected with the output of the analog control circuit 6 (FIG. 1). The pulse width modulator 27 may, for instance, contain a saw-tooth or delta voltage generator, which determines the pulse width of the currents in the transistors 21, 22 in terms of the error signal emitted from the analog control circuit via a comparator. If the transistors 21, 22 are switched off, the induction current supplied from the primary coil of the transformer 4 flows off via the diodes 23, 24.

Figure 3:
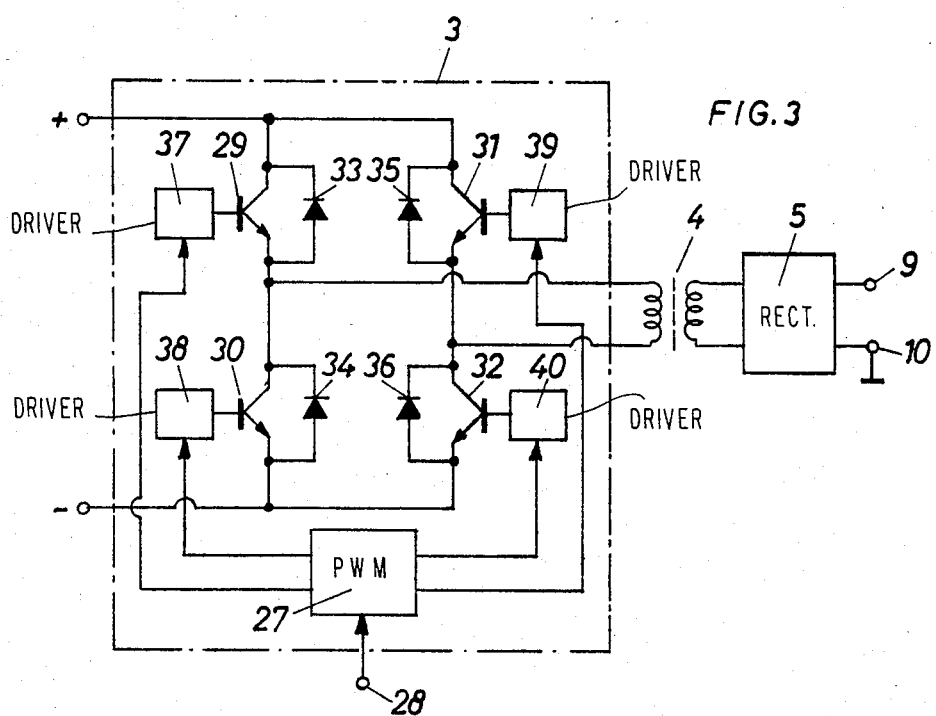
FIG. 3 illustrates the converter section as a push-pull full bridge.

FIG. 3 shows a switching stage 3 that is known as a push-pull full-bridge converter. Two switching transistors 29, 30 and 31, 32 arranged in series are each connected in parallel and fed by the direct voltage supplied from the power line rectifier 2 (FIG. 1). To each collector-emitter path of the transistors 29, 30 and 31, 32, diodes 33, 34 and 35, 36 are connected in parallel, which, as in the preceding example, divert the induction current of the primary coil of the transformer 4 in the switched-off state of the transistors. The primary coil of the transformer 4 is connected between the respective points of connection of the switching transistors 29, 30 and 31, 32 arranged in series. The transistors 29, 32 on the one hand and the transistors 30, 31 are alternately switched on and off by the pulse width modulator 27 via driver stages 37, 38 and 39, 40, the input terminal 28 of the modulator again being connected with the output of the analog control circuit 6 (FIG. 1).

With the example of a switching stage 3 according to FIG. 2 or 3 it is also possible, according to the invention, to work without secondary rectifier 5, i.e. that the secondary coil is directly connected with the output terminals 9 and 10. Consequently, an alternating current is available for welding, that is particularly suited for argon-arc or WIG(TIG) welding of aluminum or nonferrous metals. The direct connection may be realized, for instance, by bridging the secondary rectifier 5 by means of switches. As has already been mentioned in connection with the embodiment of FIG. 1, the desired output of the switched-mode power supply can be achieved by a parallel connection of several switching transistors.

It has already been pointed out in the introductory part that the admissible transistor parameters, in particular the saturation voltage $U_{CEsat}$ and the maximum collector current $I_{Cmax}$ must not be exceeded in order to avoid a destruction of the transistors. However, during the welding operation in practice permanent load fluctuations as well as dynamic and static short circuits occur, which results in two contrary requirements:

(a) On the one hand, in order to efficiently protect the transistors, it is necessary to switch them off immediately after the occurrence of an overcurrent in case of a short circuit, delay times of about 200 to 300 ns between the occurrence of the short circuit and the switching off of the transistors being the upper limit.

(b) On the other hand, in order to allow the short circuit occurring during the welding procedure on account of the continuous drop separation to take place in a manner that satisfactory welding results are achieved, relatively high short circuits currents, or high outputs, are required.

In order to meet these two requirements, a cut-off circuit is provided according to the invention, which firstly monitors the saturation state of the transistors, secondly delimits the collector current, and thirdly delimits the rate of the current rise in case of a short circuit. The cut-off circuit for an electronic welding apparatus according to the invention consists in that for monitoring the saturation voltage of the transistors first comparators are provided, that for delimiting the collector current of the transistors second comparators are provided, wherein the outputs of the first and second comparators are fed to the set input of two flip-flops whose outputs are fed to the driver stages of the transistors, if desired via amplifiers, in order to switch these off at the occurrence of too high a saturation voltage and/or too high a collector current, and that for delimiting the rate of current rise of the collector currents of the transistors there is provided in the secondary circuit of the switching transformer an additional transmitter whose primary and secondary coils arranged in series are coiled in opposite directions so that the current rise is delimited in dependence on the load and thus the welding current, on account of the countervoltage of the secondary coil.

Figure 4:
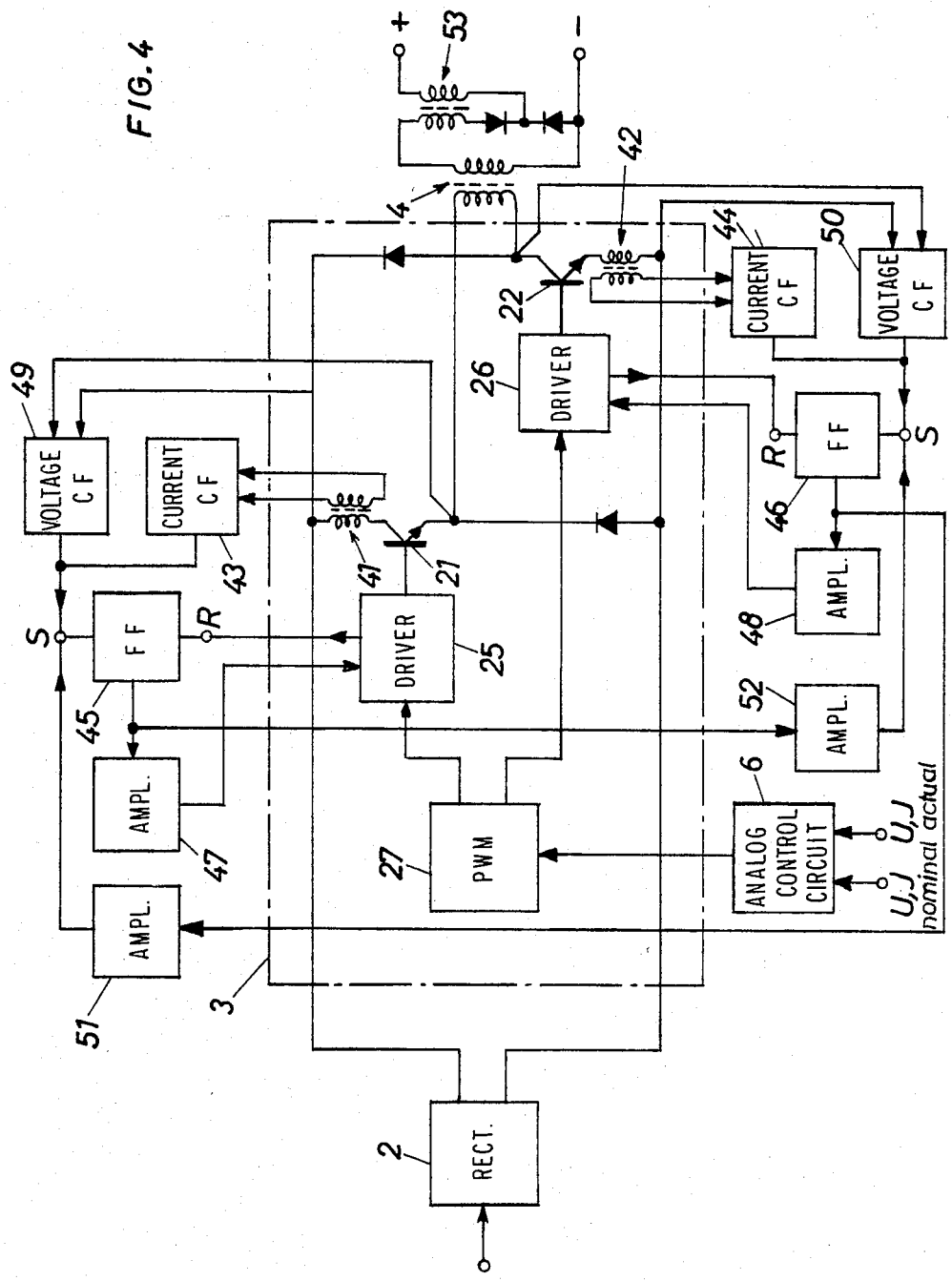
FIG. 4 is a block diagram of a welding tool according to FIGS. 1 and 3 including an additional cutout circuit according to the invention.

With the cut-off circuit illustrated in FIG. 4, the power line rectifier is denoted by 2 and the switching stage (dot-and-dash lined) is denoted by 3. The switching stage 3, like in the example according to FIG. 2, contains two switching transistors 21 and 22, which are connected to the primary coil of the switching transformer 4. Again, it goes without saying that several switching transistors can be connected in parallel in accordance with the required output. The switching transistors 21 and 22 are controlled via the respective driver stages 25 and 26, which, in turn, are controlled by the pulse width modulator 27. The input of the pulse width modulator 27 is connected with the output of the analog control circuit 6, to which the nominal-actual value signals for the welding voltage U and the welding current I are fed.

In the following the cut-off circuit according to the invention will be explained. In the current path of each transistor 21 and 22, a current converter 41 and 42 is each provided, which emits a signal to a corresponding current comparator (CF) 43 and 44. If this signal exceeds a predetermined adjustable level, a signal appears at the output of the respective comparator 43, 44, which is each fed to the set input S of a flip-flop (RS flip-flop) 45, 46, putting the latter into, for instance, the on-state. This on-state signal, if desired, is fed to the respective driver stage 25, 26 via an amplifier 47, 48 in order to switch the same off, and thus also the transistors 21, 22.

In an analogous manner, the collector-emitter voltage of the transistors 21 and 22 is conducted to voltage comparators 49, 50 whose output again is connected with the set input S of the respective flip-flop 45, 46 so that, at the occurrence of a saturation voltage above a predetermined adjustable level, switching off of the driver stages 25, 26 and the transistors 21 and 22 is again effected as described above.

The resetting of the two flip-flops 45 and 46 is effected in a manner that at the end of the short circuit of the respective driver stage 25, 26 a reset signal is transmitted to the reset input R of the respective flip-flop 45, 46. The reset signal, for instance, is taken by a transistor (not illustrated) available in the driver stage and fed to the reset input R via a resistance and uncoupling network (not illustrated). The reset signal, for instance, carries positive potential during the switch-in period of the transistors 21, 22 and thus is ineffective for the flip-flops 45, 46, while it receives negative potential during the locking period of the transistors 21, 22 and thus resets the flip-flops 45, 46.

According to a further characteristic feature of the invention it is provided that, at a response of one of the current comparators 43, 44 or voltage comparators 49, 50, the two transistors 21 and 22 are synchronously switched off. This is effected in a manner that e.g. the output of the flip-flop 46 is fed to the set input S of the flip-flop 45, if desired via an amplifier 51. In the same manner, the output of the flip-flop 45 is fed to the set input S of the flip-flop 46, if desired via an amplifier 52. By this mutual coupling of the flip-flops 45, 46 it is achieved that, at the occurrence of an error, both transistors 21 and 22 are switched off within about 200 ns.

To monitor the collector current of the transistors 21 and 22, one current converter and one current comparator would principally do, since the current of the switching transformer flows through both transistors. For safety reasons, however, two current converters 41, 42 and two current comparators 43, 44 are provided.

To delimit the rate of current rise di/dt in case of a short-circuit, an additional transformer 53 is provided according to the invention in the secondary circuit of the switching transformer 4, the primary and secondary coils of which additional transformer arranged in series are coiled in opposite directions. The secondary current (welding current) of the transformer 53 thereby induces in its primary coil a counter e.m.f., which is the greater the greater the current change in the load circuit, i.e. in the electric-arc path. This means that the current rise di/dt of the welding current is reduced the more, the stronger the welding current. This current rise limitation takes effect also on the current rise of the collector current of the transistors 21 and 22 via the inductive coupling of the switching transformer 4, thus delimiting the same.

Figure 5A:
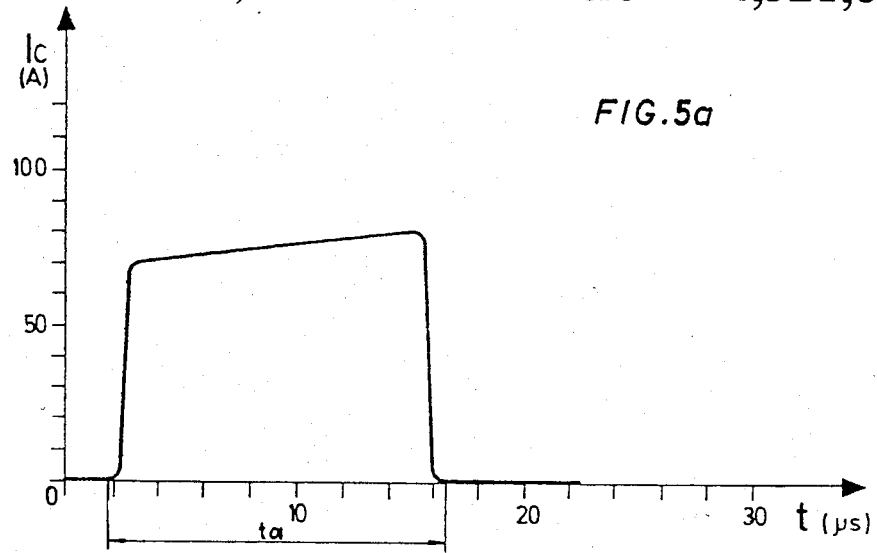
FIGS. 5a to 5c are current-time diagrams to illustrate the cut-out circuit according to FIG. 4.
Figure 5B:
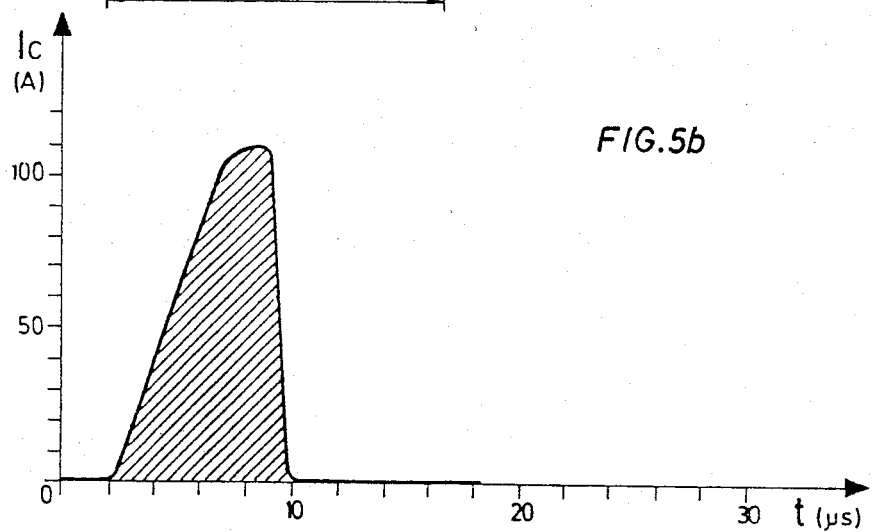
Figure 5C:
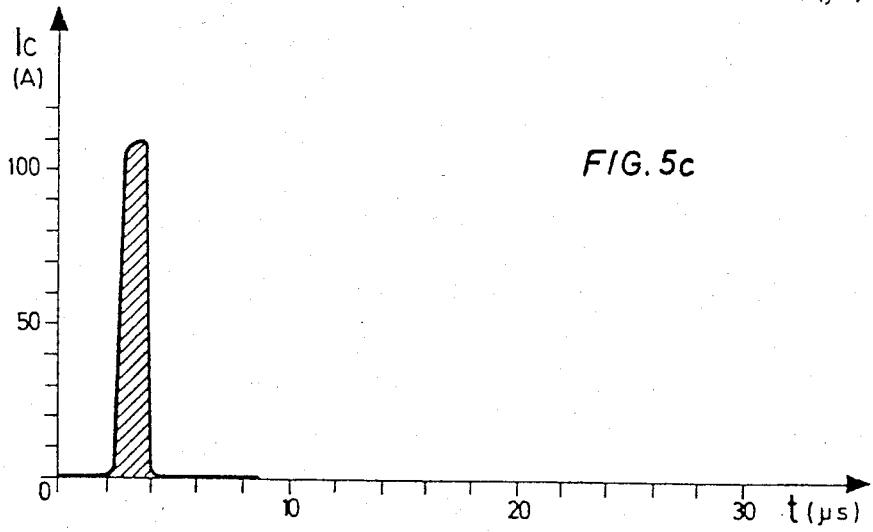

In FIG. 5a the time sequence of the collector current $I_C$ during normal operation by using the transformer former 53 for the di/dt limitation is illustrated, $t_a$ being the switch-on time of the transistors. From the rising slope, the rapid current rise with normal load can be seen. In FIG. 5b the short-circuit case under equal conditions, i.e. with di/dt limitation, is illustrated, the switch-off level by the current comparator lying at about 110 A. Despite the short circuit, the hatched current-time area is large enough to ensure a perfect drop separation. FIG. 5c illustrates a short-circuit case without di/dt limitation. It is evident that the considerably smaller current-time area does not suffice for a perfect drop separation, the quality of the welding thus being reduced.

The cut-off circuit according to the invention thus brings about the following advantages:

1. By the current and voltage comparators, a quick switching off is achieved in case of a short circuit.

2. By the di/dt limitation, the switch-off level is reached considerably later, a sufficient output thus being available for the drop separation.

3. The current rise rate di/dt decreases with increasing load.

4. No additional losses are caused which occur e.g. with relieving networks.

A further embodiment according to the invention relates to the application of the invention to the pulsed-arc welding procedure.

So far, the pulsed-arc welding procedure has been realized in a manner that a rectified basic current from a rotary current transformer was overlaid by current pulses of a two-phase transformer of a higher voltage, i.e. two voluminous current sources were necessary.

By switching in one or both half waves of the overlay transformer, an overlay frequency of 50 or 100 Hz only could be generated in that case.

By the invention, an additional device for pulsed-arc welding is provided for an electronic welding apparatus, which comprises only one current source and enables a large overlay frequency region of the welding current pulses.

This is achieved in the additional device for the electronic welding apparatus according to the invention in that a wave generator with a selectively adjustable wave shape, frequency, amplitude and pulse duty cycle is provided, whose output is connected with a first input of an amplifier, wherein to the second input of the amplifier a selectively adjustable direct current is fed, so that at the output of the amplifier an overlay signal occurs, which consists of the direct voltage and the overlaid output signal of the wave generator and is fed to a control input of the analog control of the controlled switched-mode power supply. The structure of the additional device will be described in the following by way of FIG. 6.

Figure 6:
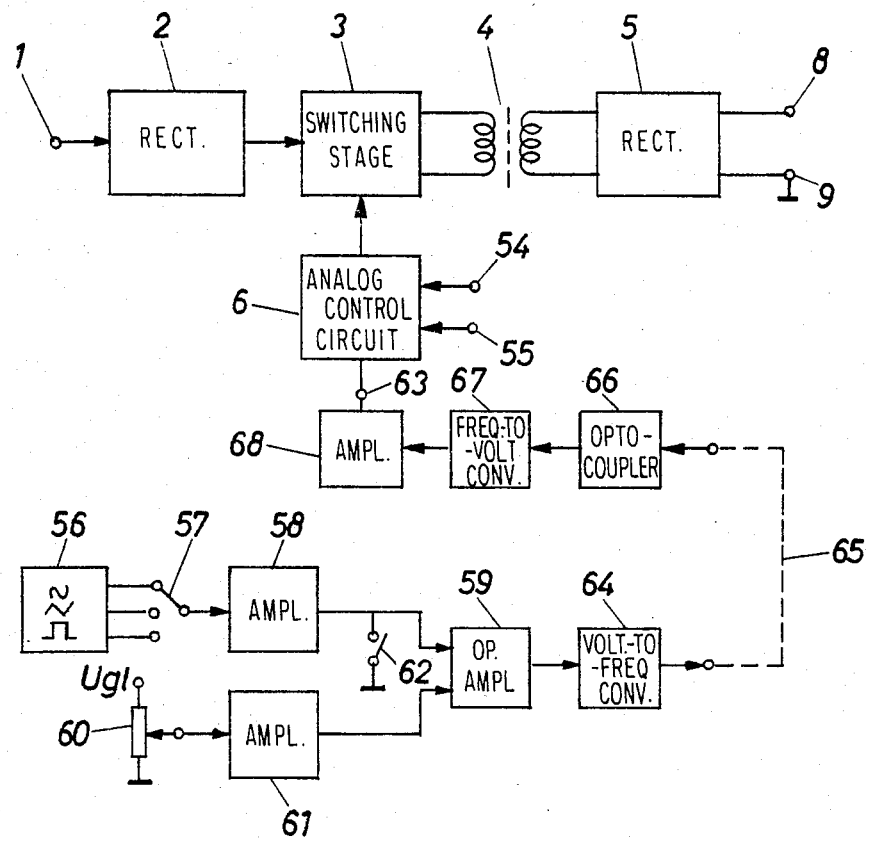
FIG. 6 is a block diagram of a modified welding tool according to the invention according to FIG. 1, which is provided for pulsed-arc welding.

In FIG. 6, the power supply is denoted by 1 and the power line rectifier of the switched-mode power supply is denoted by 2, which, preferably, is primarily controlled. To the rectifier 2 the switching stage 3 of the switched-mode power supply is connected, which in turn is connected with the transformer 4. To the output of the transformer 4, the secondary rectifier 5 is connected. The switching stage 3, or its pulse width modulator, is again controlled by the analog control circuit 6 to which the actual values of the welding current and of the welding voltage are fed via the connections 54 and 55. The terminals 8 and 9 departing from the secondary rectifier 5 again serve to connect the welding cable.

A wave generator 56 (e.g. type XR 2206) selectively generates sinusoidal, delta, or rectangular signals whose frequency, amplitude and pulse duty cycle are adjustable. These signals, via a transformer 57 and, if desired, via an amplifier 58, reach an amplifier 59, which is designed, for instance, as an operational amplifier.

To the amplifier 59 a direct voltage is additionally fed, which is taken from a potentiometer 60 lying at a constant voltage $U_{g1}$ and, if desired, is fed to the amplifier 59 via an amplifier 61. The output of the amplifier 59 thus delivers a direct voltage which is overlaid by the signal of the wave generator 56, the direct voltage corresponding to the basic-current adjustment and the wave signal corresponding to the welding current pulses. The output of the amplifier 58 can be short-circuited to frame via a switch 62 so that only the basic current signal reaches the amplifier.

The overlay signal emitted by the amplifier 59 can be fed to a control input 63 of the analog control circuit 6, if the structural parts 56 to 62 are housed in the casing of the electronic welding tool. According to the invention these structural parts 56 to 62 suitably are housed in a separate casing that can be used near the welding site, which makes possible a remote control of the electronic welding tool. For this purpose, a voltage/frequency converter 64 is connected to the output of the amplifier 59 according to the invention, which converts the overlay signal into a pulse sequence of variable frequency, which are conducted via a remote-control line 65 to an optocoupler 66 housed in the casing of the electronic welding tool for the galvanic separation of the current circuits. The output signal of the optocoupler 66 is fed to a frequency/voltage converter 67, which converts the pulse sequence back to the original overlay signal. By transmitting the pulse sequence via the remote-control line, interferences are largely eliminated. The overlay signal regained in this manner is fed to the already described control input 63 of the analog control circuit 6, if desired via an amplifier 68.

Figure 7:
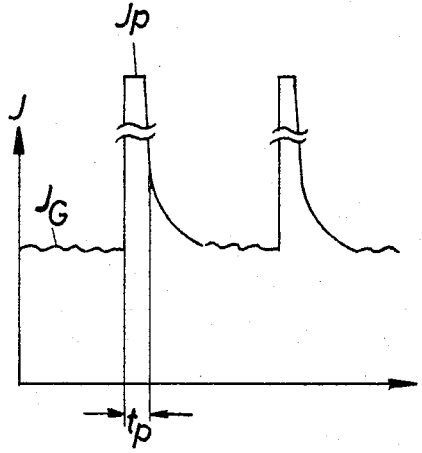
FIG. 7 is a current-time diagram to illustrate the mode of operation of the welding apparatus according to FIG. 6.

On account of the high switching frequency of 25 kHz of the switched-mode power supply, it is possible to overlay the basic current $I_G$ of about 30 to 40 A adjusted by the potentiometer 56, by welding current pulses $I_p$ of about 350 A with a sequence frequency of 25 to 1,000 Hz, preferably 100 Hz, which have an adjustable pulse time $t_p$ of about 2 to 40 ms (FIG. 7). As can be seen from FIG. 7, the descending slope of the welding current pulse $I_p$ at first descends rapidly and then subsides more slowly. This slow descent counteracts the extinction of the electric arc during the pulse break and can be achieved, for instance, by an integral member (not illustrated) at the output of the curve generator 56.

What I claim is:

1. In an electronic welding apparatus including a control element for controlling at least one welding parameter, such as welding current or welding voltage, the improvement which is characterized in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing semiconductors as switching means, a pulse width modulator connected to the output of said analog control circuit, and driver stages, said switching means being controlled by said pulse width modulator via said driver stages; and further comprising analog/digital converters, the actual values of said welding current and said welding voltage being fed to said microprocessor control via said analog/digital converters for forming the product of said actual values, and a digital- /analog converter, said product being fed as an actual value to said analog control circuit via said digital-/analog converter, and an opto-coupler connected between said microprocessor control and said analog/-digital converter for the welding voltage for a galvanic separation.

2. In an electronic welding apparatus including a control element for controlling at least one welding parameter, such as welding current or welding voltage, the improvement which is characterised in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing switching transistors as switching means, a pulse width modulator connected to the output of said analog control circuit, and driver stages, said switching means being controlled by said pulse width modulator via said driver stages; and a cut-off circuit comprising first comparators, second comparators, two flip-flops each having a set-input and an output, a transformer having a secondary circuit and an additional transformer, wherein said first comparators are provided for monitoring the saturation voltage of said switching transistors, said second comparators are provided for limiting the collector current of said switching transistors, the outputs of said first and said second comparators being guided to the set-inputs of said two flip-flops, and the outputs of said flip-flops being guided to the driver stages of said switching transistors for switching them off if an excessively high saturation voltage or an excessively high collector current occur, and wherein for delimiting the current rise time of the collector currents of the switching transistors said additional transformer is provided in said secondary circuit of said transformer, said additional transformer having a primary and a secondary coil arranged in series and coiled in opposite direction so that, due to the counter voltage of the secondary coil, the current rise is delimited in dependence on the load and thus on the welding current.

3. An electronic welding apparatus as set forth in claim 2, said cut-off circuit further comprising amplifiers, the outputs of said flip-flops being guided to the driver stages of the switching transistors via said amplifiers.

4. An electronic welding apparatus as set forth in claim 2, further comprising a wire feed motor, a rotatable pulse generator, pressure pick-ups, and cooling circuit and a protective gas conduit, said microprocessor control controlling said wire feed motor, the actual value of said wire feed rate being fed to said microprocessor control via said rotatable pulse generator, and said microprocessor control monitoring the water pressure in said cooling circuit and the pressure in the protective gas conduit via said pressure pick-ups and issuing orders initiating the welding procedure when the correct pressures exist.

5. In an electronic welding apparatus including a control element for controlling at least one welding parameter, such as welding current or welding voltage, the improvement which is characterized in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing switching transistors as switching means, a pulse width modulator connected to the output of said analog control circuit, and driver stages, said switching means being controlled by said pulse width modulator via said driver stages; and a cut-off circuit comprising first comparators, second comparators, two flip-flops eaching having a set-input and an output, a transformer having a secondary circuit and an additional transformer, wherein said first comparators are provided for monitoring the saturation voltage of said switching transistors, said second comparators are provided for limiting the collector current of said switching transistors, the outputs of said first and said second comparators being guided to the set-inputs of said two flip-flops, and the outputs of said flip-flops being guided to the driver stages of said switching transistors for switching them off if an excessively high saturation voltage or an excessively high collector current occur, and wherein for delimiting the current rise time of the collector currents of the switching transistors said additional transformer is provided in said secondary circuit of said transformer, said additional transformer having a primary and a secondary coil arranged in series and coiled in opposite direction so that, due to the counter voltage of the secondary coil, the current rise is delimited in dependence on the load and thus on the welding current, and wherein the output of one of said two flip-flops is each connected with the set-input of the other one of said two flip-flops, so that, when one of said two flip-flops is set, simultaneously also the other one of said two flip-flops is set.

6. An electronic welding apparatus as set forth in claim 5, said cut-off circuit further comprising further amplifiers via which the output of one of said two flip-flops is each connected with the set-input of the other one of said two flip-flops.

7. In an electronic welding apparatus including a control element for controlling at least one welding parameter, such as welding current or welding voltage, the improvement which is characterised in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing semiconductors as switching means, a pulse width modulator connected to the output of said analog control circuit, and driver stages, said switching means being controlled by said pulse width modulator via said driver stages; and a pulsed-arc additional device comprising a wave form generator with selectively adjustable wave shape, frequency, amplitude and duty cycle and having an output, and an amplifier having a first input, a second input and an output, said output of said wave form generator being connected to said first input of said amplifier, and a selectively adjustable direct current being applied to said second input of said amplifier, an overlaying signal thus occurring at the output of the amplifier, said overlaying signal being comprised of said direct current and said overlaid output signal of said wave form generator, and further comprising a control input of said analog control circuit of said controlled switching mode power supply, said overlaying signal being fed to said control input of said analog control circuit.

8. An electronic welding apparatus as set forth in claim 7, said pulsed-arc additional device further comprising a voltage/frequency converter, a remote control conduit, and a frequency/voltage converter, said voltage/frequency converter being connected to the output of said amplifier and having an output that is connected to the input of said frequency/voltage converter via said remote control circuit, the output of said frequency/voltage converter being connected to the control input of said analog control circuit.

9. An electronic welding apparatus as set forth in claim 8, said pulsed-arc additional device further comprising an optocoupler provided between the input of said frequency/voltage converter and said remote control conduit.

10. In an electronic welding apparatus including a control element for controlling at least one welding parameter, such as welding current or welding voltage, the improvement which is characterised in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing semiconductors as switching means, a pulse width modulator connected to the output of said analog control circuit, and driver stages, said switching means being controlled by said pulse width modulator via driver stages; said electronic welding apparatus further comprising a wire feed motor, a rotatable pulse generator, pressure pick-ups, a cooling circuit and a protective gas conduit, said microprocessor control controlling said wire feed motor, the actual value of the wire feed rate being fed to said microprocessor control via said rotatable pulse generator, and said microprocessor control monitoring the water pressure in said cooling circuit and the pressure in the protective gas conduit via said pressure pick-ups and issuing orders initiating the welding procedure when the correct pressures exist.

* * * * *